Sept. 2, 1930.  W. WHEELER  1,774,741
AIR COOLED MOTOR
Filed June 13, 1925
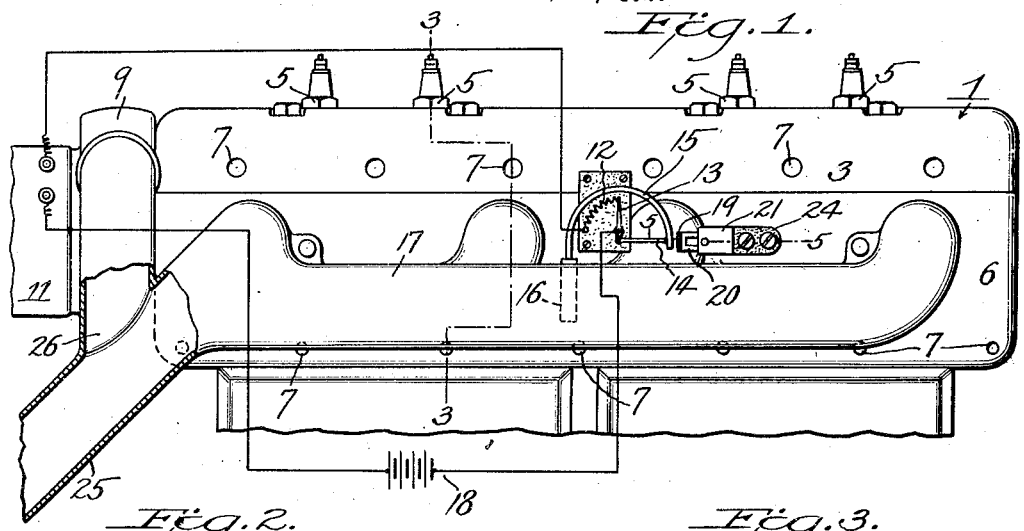
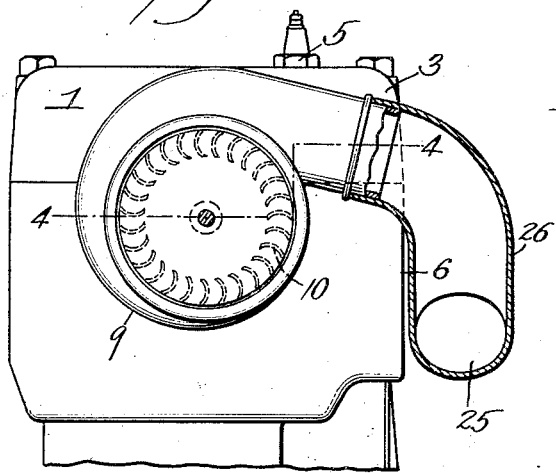
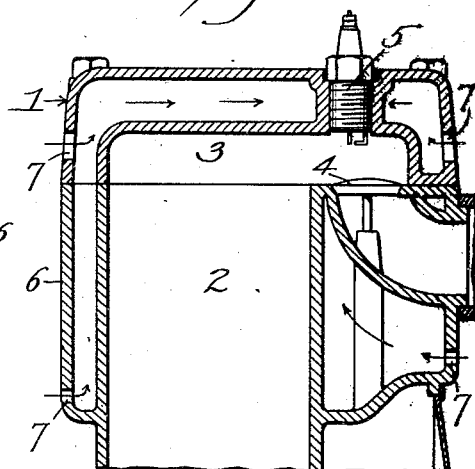
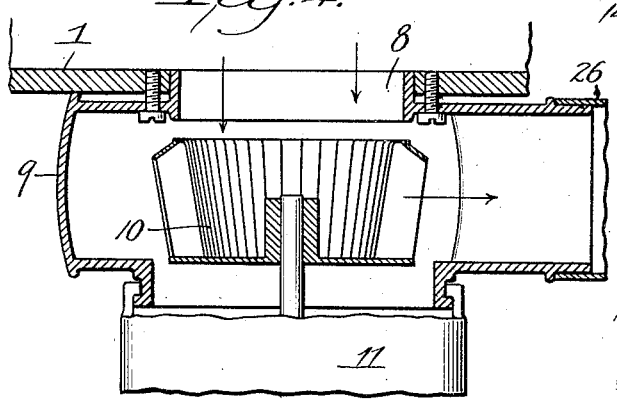
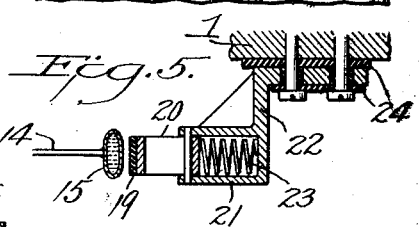
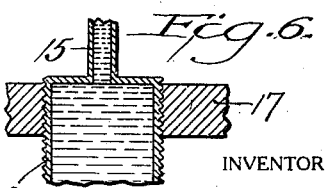
INVENTOR
WILLIAM WHEELER
BY
Frederick J. Baker
ATTORNEY Patented Sept. 2, 1930

1,774,741

UNITED STATES PATENT OFFICE

WILLIAM WHEELER, OF BROOKLYN, NEW YORK

AIR-COOLED MOTOR

Application filed June 13, 1925. Serial No. 36,774.

This invention relates to internal combustion engines, and my improvements are directed to novel means for cooling the cylinder walls with air.

In carrying out my invention I employ a jacket which surrounds the engine parts to be cooled in the same manner as in water cooling systems, but I cause a current of air to flow through the jacketed space, using, for example, a suction fan for the purpose.

The fan is driven by an electric motor under the control of a rheostat, which is actuated by a thermostatic device that responds to the variations of temperature in the exhaust manifold, to the end that the flow velocity of air passing through the jacket may vary automatically in accordance with the engine cooling requirements.

Another feature of my invention consists in discharging the engine cooling air out through the engine exhaust pipe, thereby causing it to increase the volume and flow rate of the issuing gases, whereby the cylinders become more thoroughly scavenged.

Other features and advantages of my invention will hereinafter appear.

In the drawing:

Figure 1 is a side elevation of an internal combustion engine provided with my improvements.

Fig. 2 is an end view thereof, with the exhaust pipe shown in section.

Fig. 3 is a section on the line 3—3 of Fig. 1.

Fig. 4 is a section on the line 4—4 of Fig. 2.

Fig. 5 is a section on the line 5—5 of Fig. 1, and

Fig. 6 is an enlarged partial, sectional view of the thermostatic device.

In said views let 1 indicate an engine having cylinders whereof an example is shown at 2, Fig. 3, provided with cylinder head 3, valve 4 and spark plug 5. The cylinders and cylinder heads are surrounded by a jacket 6, in spaced relation therewith, said jacket being provided with air inlet openings 7.

The jacket 6 is shown as provided, at one end of the engine, with an opening 8, where it connects with a fan casing 9, containing a suction fan 10, adapted to draw a current of air through the jacket. The inlet openings 7 are positioned in the jacket in such manner that the induced current of air flowing to the fan is caused to completely envelop the engine parts requiring to be cooled.

The fan is shown as provided with a motor 11, to drive it.

The electric current supplied to the motor 11 is controlled by a rheostat 12, having a pivotal contact arm 13 that normally permits the full resistance to be included in the circuit, in order that the fan speed may be low while the engine is cool. A link 14 connects arm 13 with the free end of a curved, flat or oval-sectioned tube 15, whose other end connects with a vessel 16, containing water, and located within the exhaust manifold 17, to be there subject to the varying heat of the passing exhaust products.

The normal curvature of tube 15, may, for example, be as shown in Fig. 1, but as pressure rises in vessel 16 and said tube due to expansion of the fluid therein, said tube will thereby tend to straighten out. In such straightening out action tube 15 carries the link 14 with it, and consequently arm 13 is thereby swung and caused to progressively cut out the resistance, thereby enabling the motor speed to increase. Conversely, as the exhaust temperature lowers, the resistance will again be introduced in the circuit as pressure diminishes in tube 15.

A source of electrical energy for the operation of the motor, through the rheostat, is shown at 18.

As the tube 15 straightens out or increases its arc under the pressure of expansion therein, its free end comes in contact with insulation 19 upon buffer 20, which is reciprocable in a tube 21 that is carried by a bracket 22; a spring 23 within the tube serving to hold said buffer normally extended, but yielding under the pressure of expansion within the tube to permit the automatic functioning of the rheostat. The bracket 22 is secured to the engine, but is insulated therefrom by insulation 24.

It will be appreciated that the volume of air induced is proportioned to the speed at which the fan is operated by the motor, and as the motor speed is regulated by the rheostat, which itself is controlled by the thermostat, hence it follows that as the thermostat functions in accordance with the varying temperature in the exhaust manifold, therefore the velocity of air flow through the jacket is automatically adjusted to the actual needs of the engine for keeping its cylinder walls at a suitable temperature.

The exhaust pipe 25, leading from manifold 17, is tapped obliquely, in the direction of the exhaust flow therethrough, by the outlet 26 of the fan casing 9, so that the current of air that has been drawn through the jacket 6, to cool the engine, is discharged into the exhaust pipe, thereby facilitating the expulsion of the exhaust gases and lowering the temperature thereof.

Variations within the spirit and scope of my invention are equally comprehended by the foregoing disclosure.

I claim:

1. The combination with an internal combustion engine of a jacket therefor provided with air inlet means and outlet means, induction means for passing a current of air through said jacket, the inlet means characterized as comprising a plurality of orifices located in said jacket and the head of said engine, and means governed by the variations in temperature of the engine exhaust to control said induction means.

2. The combination with an internal combustion engine of a jacket therefor provided with air inlet means and outlet means, a fan located adjacent said outlet means, the inlet means characterized as comprising a plurality of orifices located in said jacket and the head of said engine, a motor to drive said fan, a rheostat to govern the speed of said motor, and a thermostatic device, subject to the variations in temperature in the exhaust manifold to control said rheostat.

3. The combination with an internal combustion engine of a jacket therefor provided with air inlet means and outlet means, a fan located adjacent said outlet means, the inlet means characterized as comprising a plurality of orifices located in said jacket and the head of said engine, a motor to drive said fan, a rheostat to govern the speed of said motor, a thermostatic device, subject to the variations in temperature in the exhaust manifold to control said rheostat and means of communication between said outlet means and exhaust pipe for directing the outflowing air into said exhaust pipe.

4. The combination with an internal combustion engine of a jacket therefor provided with air inlet means and outlet means, induction means for passing a current of air through said jacket, the inlet means characterized as comprising a plurality of orifices located in said jacket and the head of said engine, means governed by the variations in temperature of the engine exhaust to control said induction means, and means of communication between said outlet means and the engine exhaust for directing the outflowing air into said exhaust.

Executed this 8th day of June, 1925.

WILLIAM WHEELER.